United States Patent [19]
Beckstein et al.

[11] Patent Number: 4,786,177
[45] Date of Patent: Nov. 22, 1988

[54] METHOD AND APPARATUS FOR MEASURING THE WEFT OR MESH SERIAL POSITION IN TEXTILES

[75] Inventors: Hellmut Beckstein, Bad Abbach; Siegfried Wild, Regensburg, both of Fed. Rep. of Germany

[73] Assignee: Mahlo GmbH & Co. KG, Fed. Rep. of Germany

[21] Appl. No.: 103,059

[22] Filed: Sep. 30, 1987

[30] Foreign Application Priority Data

Oct. 1, 1986 [DE] Fed. Rep. of Germany ....... 3633439

[51] Int. Cl.⁴ .............................................. G01N 21/84
[52] U.S. Cl. .................................... 356/429; 356/430
[58] Field of Search ................ 356/429, 430, 238, 237

[56] References Cited

U.S. PATENT DOCUMENTS

| | | | |
|---|---|---|---|
| 4,248,533 | 2/1981 | Shimada | 356/430 |
| 4,255,050 | 3/1981 | Beckstein et al. | 356/238 |
| 4,414,476 | 11/1983 | Maddox et al. | 356/430 |

FOREIGN PATENT DOCUMENTS

| | | |
|---|---|---|
| 1109636 | 4/1958 | Fed. Rep. of Germany . |
| 1169778 | 12/1967 | United Kingdom . |
| 2081894 | 7/1987 | United Kingdom . |

*Primary Examiner*—R. A. Rosenberger
*Assistant Examiner*—Crystal Cooper
*Attorney, Agent, or Firm*—Burgess, Ryan & Wayne

[57] ABSTRACT

A system for measuring the weft or mesh serial position in textiles, in which the angular position of the weft-/mesh series is measured for determining the angle of distortion passing over a partial amount of the length thereof, includes an illumination measuring system which measures values of light from a light source either passing through or reflected from the textile fabric to be tested, in a substantially linear range, and an adjusting assembly which reciprocally and oscillatingly rotates the linear range about a central angle to adjust the linear range at an angle relative to the textile fabric; rotating or measuring the reflection or transmission values in several discrete equidistant angular units; a group of memories for storing the measured values corresponding to at least a few angular units; and a digital unit connected to the memories for comparing the stored values in calculating a distortion angle in response to such comparison.

15 Claims, 5 Drawing Sheets

METHOD AND APPARATUS FOR MEASURING THE WEFT OR MESH SERIAL POSITION IN TEXTILES

BACKGROUND OF THE INVENTION

The invention concerns a process for measuring a weft or mesh serial position in textiles, and an apparatus for carrying out said process.

In the production of textile fabrics, warp and weft yarns cross each other precisely at right angles. However, during different subsequent working cycles in the equipment, the fabrics can be distorted. In the production of meshed articles in circular knitting machines, the resulting tubular work is cut open so that the meshed article has a general diagonal distortion after being cut open. In both cases, such distortion must be prevented by adequate straightening machines which use the distortion angle as a control value. Therefore, it is necessary to measure the distortion angle.

An apparatus is known for measuring the distortion angle, in which a source of light radiates the continuous textile webs. Two photocells with apertured stops situated in front thereof, are disposed opposite to the source of heights, the central axes of the apertures forming angles with each other. A measure of the angular course of the weft yarn can be deduced from the differential signal of the photocells. However, the use of two optical electric systems is disadvantageous because of the balance problems involved and of the small "pull-in range" determined by the angle between both apertured stops.

In German Pat. No. 16 35 266 there is described an apparatus in which a single aperture with photosensors situated at the rear thereof, is reciprocally rotated about an angle by an electrodynamic drive system, the rotational movement taking place about a central angle determined by the proximity to the mechanical resonance frequency of the system. Therefore, the speed of the rotational movement is predetermined by the system. The output signal of the photosensor is summed over a period of time by an amplifier, the sign of the amplification being always reversed on opposite sides of the line defining the central angle. The signal summed over a period is therefore zero when the measured values are symmetrically distributed around the central angle. This is the case when the weft yarn has the same direction as the central angle. In addition, such a system includes a follower control device which adjusts the entire system or the central angle according to a momentary measurement in a manner such that the central angle always runs parallel with the weft. Therefore, a direct measuring of the course of the weft or of the distortion angle is possible with reference to the central angle.

This known system is disadvantageous in that it is not possible by the mechanically predetermined oscillation frequency, to coordinate the measuring with the speed of the fabric or with the number of weft yarns per unit time. In case of high speeds of the fabric or when many weft yarns per unit time are passed by the apparatus, the measuring speed is limited by the oscillation frequency. In the case of low speeds of the fabric and/or very thick weft yarns (such as carpets or the like), the oscillation frequency is much too high so that it is no longer possible to obtain any correct measurement of the distortion angle. Further, due to the manner in which the measurement results are evaluated that is, reversal of the central angle, there is the danger that "secondary maximums" that occur in certain kinds of fabrics and reach into the pull-in range may be tracked. As a result, the follower control device may not track the course of the weft yarn, but instead, may track a pattern moving diagonally thereto and determined by the kind of weave.

German Pat. No. 11 09 636 has disclosed a similar apparatus wherein, to the contrary, the linear range does not reciprocally oscillate, but rather, rotates about a central angle.

Although a better adaptation of the speed of the angular variation to the speed of the angular variation to the speed of the fabric is possible with this apparatus, the largest part of information is lost, since the aperture moves only over a fragment of the whole circle into the angular range of interest.

OBJECTS AND SUMMARY OF THE INVENTION

Departing from the above cited prior art, the problem to be solved by the invention is further to develop a process and apparatus of the kind mentioned above in the sense of making possible an optimal adaptation to the speed and kind of the fabric for the perfect detection or measuring of the distortion angle.

This problem is solved by effecting rotational movement of the linear range or measurement of the reflection or transmission values in discrete angular scales, and determining the distortion angle by a comparison of the weighted measured values. Therefore, the aforementioned movement, either oscillating or rotational, is replaced by a stepped movement. It has actually been surprisingly found that quite few discrete measured values suffice for exactly determining the course of the weft. This is particularly surprising because it has hitherto been assumed that a continuous signal course with relatively high bandwidth, that is, a very high information rate per time, must be evaluated to be able to determine exactly the distortion angle.

The measurements are preferably effected for very few angular units, but a narrow angular width of the linear range relative to the spacing of the angular units is selected. In this manner, the course of even thin yarns can be exactly determined without reducing the angular resolution.

The sequence in time of the angle units is advantageously selected depending on the fabric speed and the nature of the fabric (yarn count) so that the information obtained can be always evaluated in the same manner. Therefore, the same number of measured values is used for each definition of angle.

In a first preferred embodiment of the method according to the present invention, the distortion angle is determined with reference to the angular position of the maximums and/or minimums of the measured values. Such maximums or minimums can originate both from the course of the weft and from other patterns predetermined by the kind of weave, such patterns being again correlated with the position of the weft. In another preferred embodiment of the method according to the present invention, the distortion angle is determined by determining symmetrical properties of the measured values in relation to a central angle, that is, with reference to the position of several maximums or minimums, which in turn are correlated with the position of the weft and/or a certain course of pattern depending on the kind of weave.

In both cases, it is advantageous for determining the position of the maximums and/or minimums to interpolate between the measured values on the basis of a known mathematical function. This mathematical function can be a straight line (linear interpolation) or also a hyperbola or parabola, which is oriented mainly to the kind of weave. By the interpolation, a further increase of the measuring precision is possible despite less measuring points or angular units.

It is possible to determine the unit closest to the distortion angle existing with respect to the central angle about which the tilting or rotating machine movement (in discrete angular units) takes place. In another preferred embodiment of the invention, the central angle is selected as a unit between two extreme values (maximum or minimum) so that said central angle forms with the weft a defined angle in accordance with the kind of weave.

The apparatus according to the invention is characterized in that the adjusting means is designed in a manner such that the linear range is tilted or rotated in discrete, equidistant angular units. In this regard, a group of memories is provided for storing the measured values corresponding at least to a few angular units, and a digital unit connected with the group of memories interrelates (compares) the memory contents and calculates the distortion angle from the result of the comparison. The digital unit can be separately designed, but obviously it is also possible to program a microprocessor or a minicomputer according to the method described above.

As an adjusting means, a stepping motor can be used which causes a known detector system reciprocally, to rotate in steps, the detector system per se including cylindrical lenses, an apertured stop and a photocell. It is also possible, instead of a mechanical rotation, to effect a "virtual rotation" by a corresponding time delay of the light values measured on separate points of the linear range so that the sensor can be designed as a stationary sensor cell (CCD camera).

The above and other objects, features and advantages of the invention will be appreciated from the following description, which is to be read in connection with the accompanying drawings.

DETAILED DESCRIPTION OF THE PREFERRED EMBODIMENT

Figure 1:
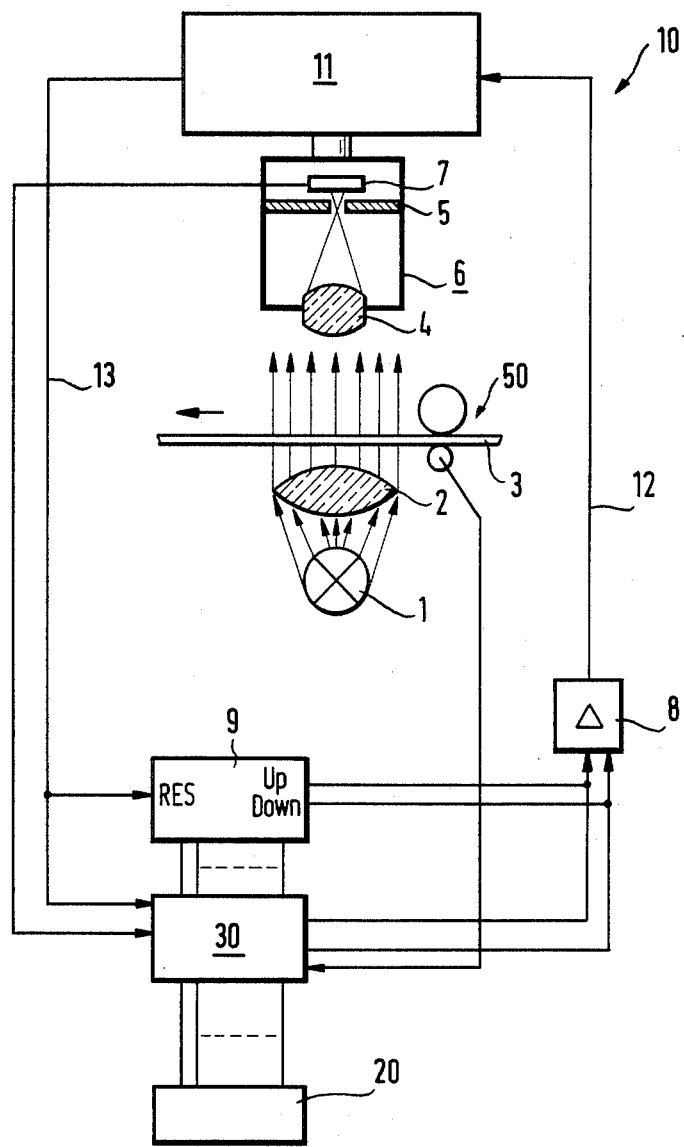
FIG. 1 is a diagrammatic block diagram of a first embodiment of apparatus according to the invention.

In the preferred embodiment of the apparatus according to the invention shown in FIG. 1, a lighting source 1 radiates light through a forwardly connected lens 2 onto the rear side of a continuous web of fabric 3. The light that passes therethrough passes through a cylindrical lens 4 and an apertured stop 5 onto a photocell 7. Photocell 7 is contained, together with apertured stop 5 and cylindrical lens 4, in a housing 6 fastened to the shaft of a stepping motor 11 and can be rotated away therefrom, about the optical axis of the system.

Stepping motor 11 is driven via a control line 12 by a stepping motor control 8 according to control signals from a digital unit 30. To arrive at a defined zero position, stepping motor 11 includes a corresponding transmitter (not shown) which detects the angular position of its shaft, and which transmitter, upon arriving at the defined zero position, sends a corresponding signal via a positioning outlet 13 to digital unit 30 and to a counter 9 so as to reset the counter 9 to zero. The UP/DOWN inputs of counter 9 are connected with the corresponding forward/backward control lines from digital unit 30.

In operation, digital unit 30, by delivering corresponding control signals to stepping motor control 8, moves the shaft of stepping motor 11 to its defined zero position at which time the corresponding positioning signal from positioning outlet 13 is supplied to digital unit 30. At this point, counter 9 is also reset. Therefore, each further stepping motor 11, is registered in counter 9 so that the numeric values in counter 9 directly correspond to a specific angle.

The output of photocell 7 is likewise supplied to digital unit 30 which converts the signal amplitudes at the respective angular positions into digital values and stores them in a memory 20 for further processing. In addition, a detection system 50 supplies, via a corresponding output line, information concerning the running speed of fabric web 3, to digital unit 30. It is obviously possible to deduce from the output signal from detector 7 the yarn count per unit of time.

The method according to the present invention that can be carried out with the apparatus shown in FIG. 1, will now be described with reference to FIGS. 2 to 8.

Figure 2:
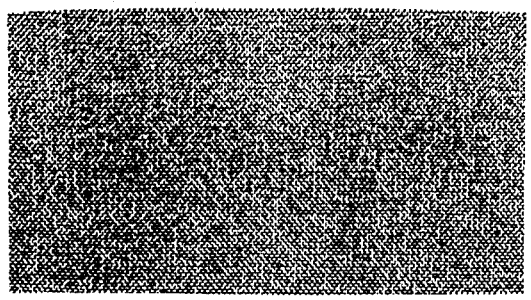
FIG. 2 is a fabric pattern to be measured.
Figure 3:
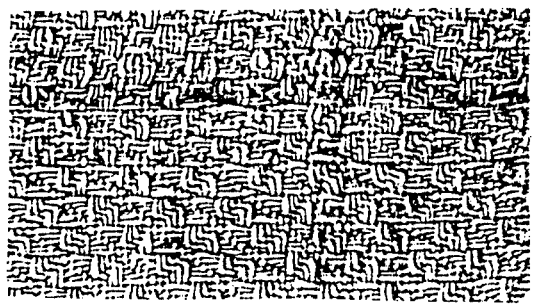
FIG. 3 is a fabric pattern to be measured.
Figure 4:
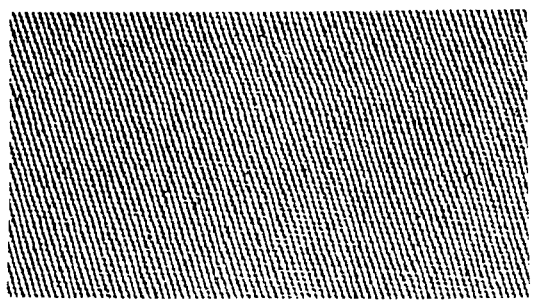
FIG. 4 is a fabric pattern to be measured.
Figure 6:
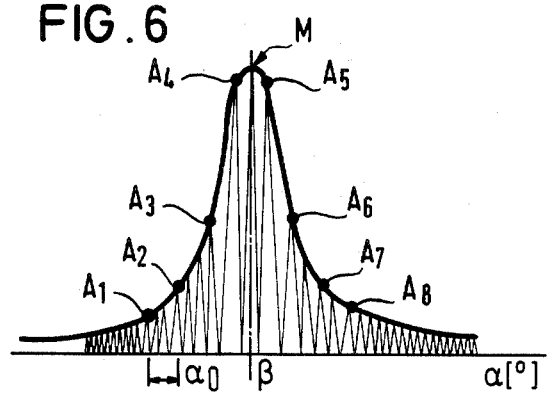
FIGS. 6 to 8 are graphical diagrams of signal courses, depending on the angle formed by the linear range and the fabric.
Figure 7:
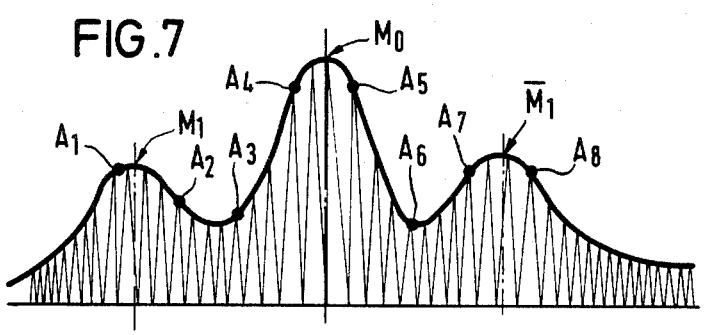

Observing the fabric patterns shown in FIGS. 2 to 4, it becomes clear that the course or track of the weft that is horizontal in the figures, depending on the kind of weave, and much more in the case of knitted fabrics, is not clearly definable without failure by the perviousness to light of a linear range. Depending on the kind of weave, different relationships of the detector signals over the angle α of apertured stop 5, that define the linear range, are expected. The course shown in FIG. 6 would be conceivable when examining the woven material shown in FIG. 2, and it has only a single maximum M. In other kinds of weave, as shown in FIG. 7, there appear secondary maximums $M_I$ and $\overline{M}_I$ next to the main maximum MO, while in FIG. 8 there is shown a signal course (over the angle α) in which the middle maximum $M_O$ originating from the weft is a local maximum with a lesser maximum amplitude than both secondary maximums $M_I$ and $\overline{M}_I$.

Figure 5:
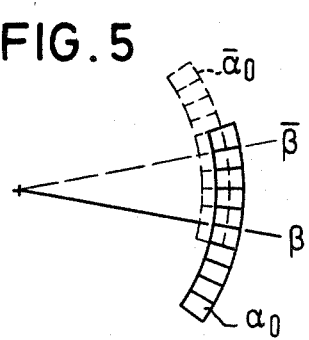
FIG. 5 is a diagrammatic representation used for explaining the angle units used with the method of the invention.
Figure 8:
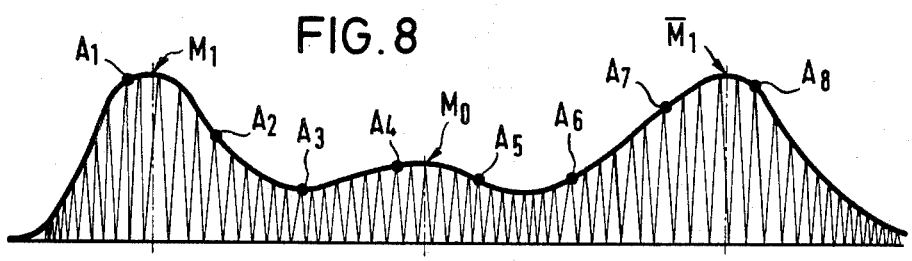

In all cases, the signal curves are recorded not continuously but only at discrete points $A_I$ to $A_8$. This causes the aperture arrangement with the detector, etc. to be reciprocally moved by stepping motor 11 in defined steps, as shown in FIG. 5, about a central angle $\beta$. Digital unit 30 then interpolates between the values $A_l$ to $A_8$, in case a simple symmetry view cannot give, in "simple" signal ratios as in FIG. 6, sufficient information about the position of the weft or of the (single) maximum M. If a distortion of the weft occurs, the aperture arrangement is reproduced by means of stepping motor 11, since a new central angle $\overline{\beta}$ (FIG. 5) is selected and stepping motor 11, therefore, in its upwardly oriented movement in FIG. 5, is advanced a few steps until this new central angle $\overline{\beta}$ is reached and the measuring points $A_l$ to $A_8$ are again substantially symmetrical with the measuring curve or maximum M. In FIGS. 6 to 8, the measuring points each have a smaller (angular) width than the stepping width $\alpha_O$ of stepping motor 11, and thus no "obliteration" of the information results.

Figure 9:
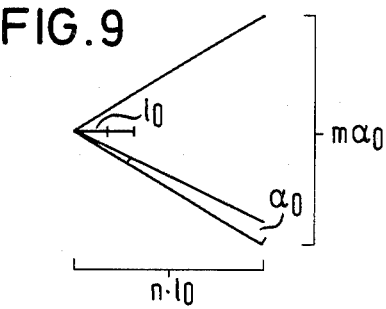
FIG. 9 is a diagrammatic representation used for explaining another preferred embodiment of the invention.
Figure 10:
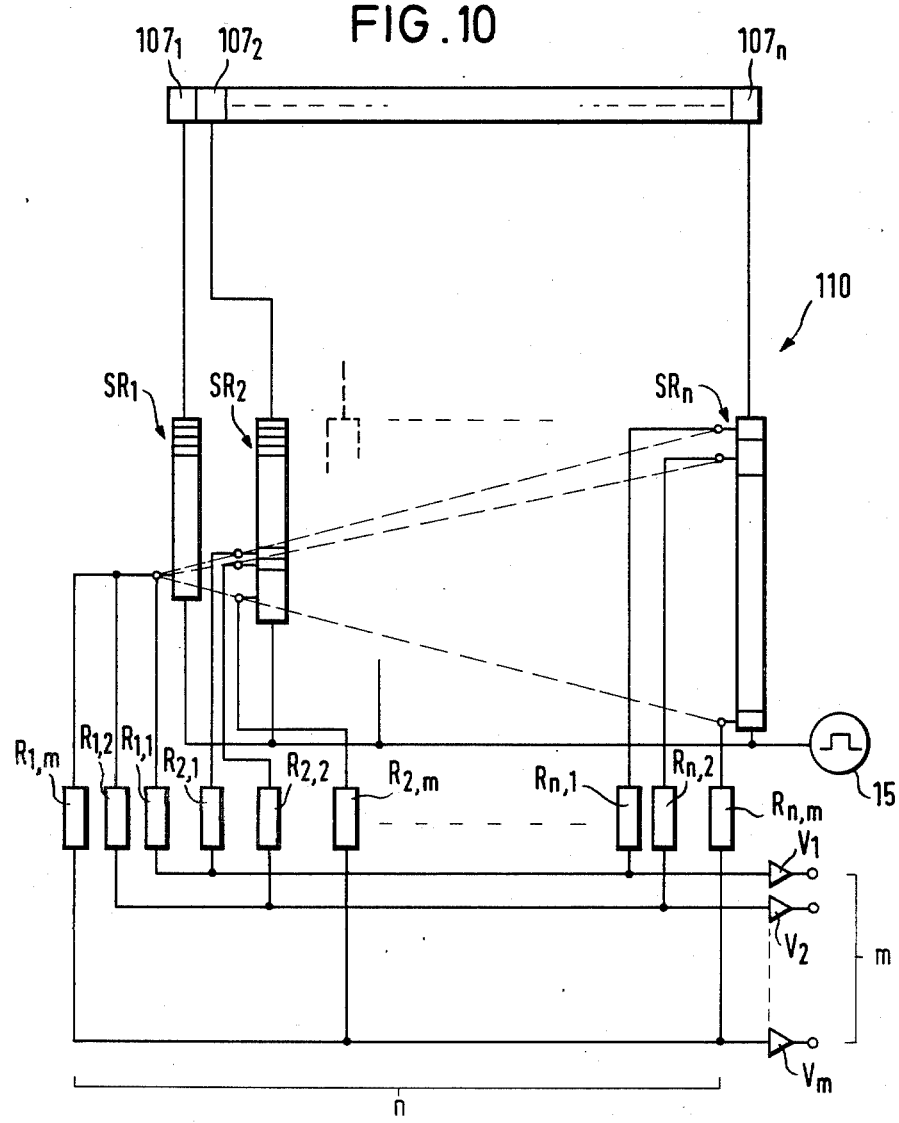
FIG. 10 is a diagrammatic block diagram of a second preferred embodiment of the apparatus according to the invention.

The method according to the invention can also be carried out with the apparatus, as explained herebelow with reference to FIGS. 9 and 10. In this case, the aperture arrangement for observing a substantially linear range is constructed as a sensor line having combined separate sensors $107_1$ to $107_n$ that are stationary, that is, not reciprocally swinging. Such sensor arrangement can be obtained by so-called CCD cameras, the signal transmission then being serial and not parallel, as shown in FIG. 10.

The adjustment of the angle of the linear range in respect to the fabric by a stepping motor in the arrangement shown in FIG. 1 is effected in the arrangement shown in FIG. 10 by a delay in time of the output signals of the individual sensor elements $107_1$ to $107_n$. The n sensor elements are substantially equidistantly disposed and exceed a length of $n \times 1_O$, wherein $1_O$ is the sensor element length predetermined by an optionally serially connected optical system and the sensor dimensions.

The signals originating from separate sensors $107_1$ to $107_n$ reach the respective shift registers $SR_l$ to $SR_n$ which are respectively controlled, in the embodiment shown in FIG. 10, by a common pulse generator 15. Shift registers $SR_l$ to $SR_n$ are tapped in different places in a manner such that a different delay in time results for each one of the sensor signals. The output signal of the first sensor $107_1$ is delayed at a constant rate whereas the output signal of the last sensor $107_n$ is tapped according to the desired number m of angle positions in a total of m angular points. Shift registers $SR_2$ to $SR_{(n-1)}$ situated therebetween are tapped in other places in a manner such that, as shown by dashed lines in FIG. 10, a scanning image results, when the fabric speed is constant, as it has already been explained in connection with the apparatus according to FIG. 1. Therefore, the time delay in the shift registers essentially follows the function: $\tau = n \times 1_O \times tg(m \times \alpha_O)$, where tg is the number of the respective shift register. It has here been assumed in approximation that the change of the virtual length of the aperture can be omitted. It is obviously possible by adequately varied tapping of the individual sensor elements $107_1$ to $107_n$ to compensate for this virtual change in length.

The reciprocal outputs of shift registers $SR_1$ to $SR_n$ are summed by corresponding summing resistances $R_{1,1}$ to $R_{n,m}$ and summing amplifiers $V_l$ to $V_m$ connected at the outputs so that the summing signals of the angular scales $m \times \alpha_O$ at the outputs of the summing amplifiers, are produced for further processing in digital unit 30.

Obviously, it is also possible to use, instead of a series of sensor elements, a single sensor, and accordingly, to control the source of light therefor and let it scan the linear range.

It is also possible to arrange in reverse with regard to mobility, the source of light and the receiver of light, it being therefore possible to rotate a linear source of light in respect to a stationary sensor or vice versa.

Figure 11:
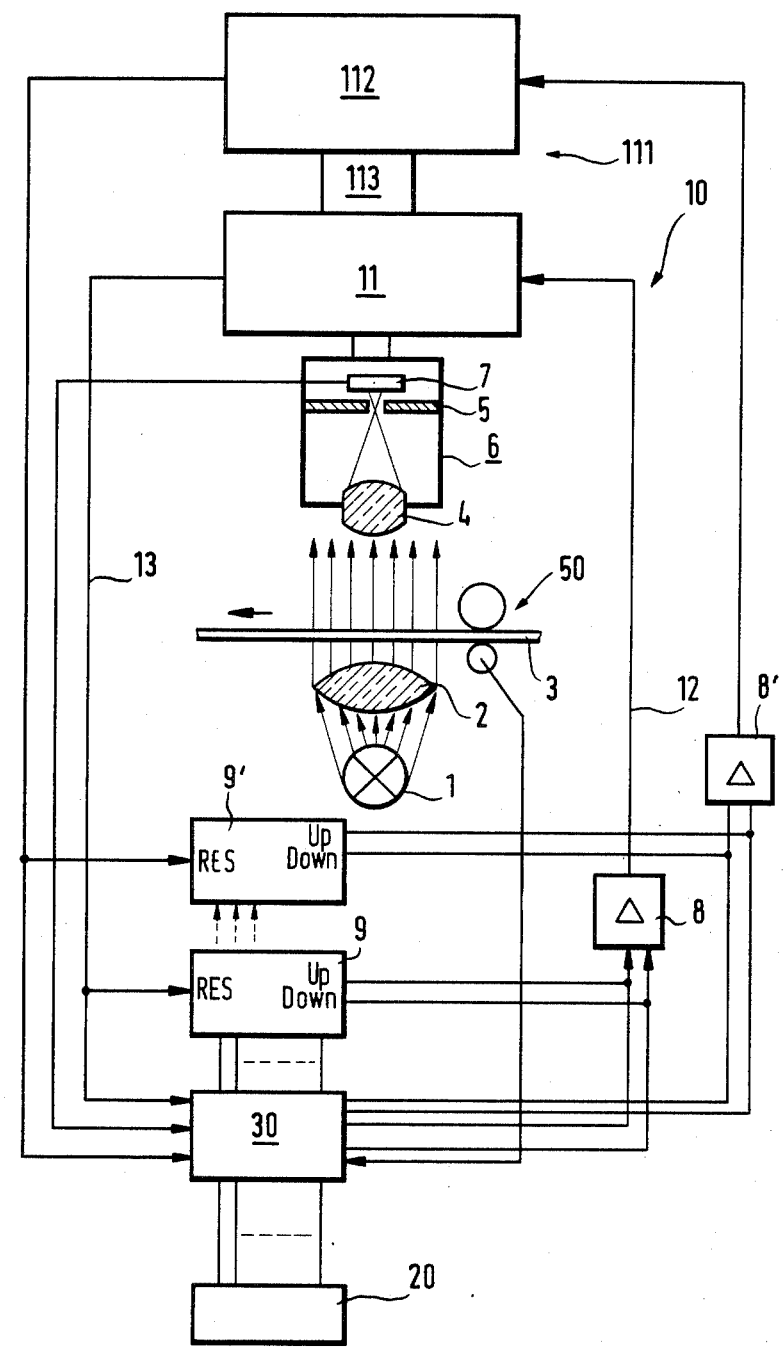
FIG. 11 is a diagrammatic block diagram of a preferred variant of the embodiment shown in FIG. 1.

In another preferred embodiment of the apparatus according to the invention, which is shown in FIG. 11, stepping motor 11 is mounted upon the output shaft of a stepdown gear 113 superposed on another stepping motor 112. The additional stepping motor 112 is controlled in a manner such that the central angle is "followed up" or fine tunes the angle situated between two angular units $\alpha_O$ of the stepping motor 11, so that the stepping motor 11 oscillatingly rotates symmetrically about the central angle.

This evidently applies in connection with the steps described at the beginning of allowing the central angle to come as near as possible to the distortion angle. With a single stepping motor, this is obtained relatively inaccurately while with the preferred embodiment of the invention shown in FIG. 11, a substantially more accurate follow up is possible. When in this embodiment of the invention, the stepping pulses fed to the second stepping motor 112 are counted in another counter 9' in an analogous manner to the stepping pulses for the stepping motor 11, it is possible to deduce the distortion angle corresponding to the central angle directly from the count of such counter. In addition, it is sufficient if the stepping motor 11 can be adjusted about only one of its angle units.

Thus, with the present invention, there are proposed a method and an apparatus for measuring the weft or mesh serial position in textiles, wherein the angular position of the weft or mesh series is measured for determining the distortion angle over a partial amount of its length by measuring with regard to its light transmission or reflection properties, a substantially linear range. The linear range is oscillatingly tilted or rotated about a central angle. The tilting or rotating movement of the linear range or the measuring of the reflection or transmission values is effected in discrete angular units. The distortion angle is determined by comparing the measured values.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope or spirit of the invention as defined by the appended claims.

What is claimed is:
1. A method for measuring a weft or mesh serial position in textiles, in which an angular position of the weft/mesh series is measured for determining an angle of distortion passing over a partial amount of the length thereof, comprising the steps of:
   (a) measuring a substantially linear range of values of said textiles with regard to light transmission or reflective properties thereof;
   (b) reciprocally and oscillatingly rotating said linear range about a central angle in discrete units;
   (c) carrying out one of:
      (i) the rotation movement of said linear range in discrete units, and

(ii) the measurement of the reflection or transmission values in several discrete angular units; and (d) comparing the measurements obtained for each one of the angle units to determine the distortion angle.

2. A method according to claim 1; wherein said step of measuring includes the steps of effecting said measurement for a few angular units, and selecting an angular width of said linear range narrowly in relation to spacing between the angle units.

3. A method according to claim 1; further including the step of adjusting a time sequence of the angular units according to a speed and nature (yarn count) of the textiles.

4. A method according to claim 1; said step of comparing determines the distortion angle with reference to the (angular) position of maximums and/or minimums of the measured values.

5. A method according to claim 1; wherein said step of comparing defines said distortion angle by determining symmetry properties of the measured values in relation to a central angle.

6. A method according to claim 4; wherein said step of comparing includes a step of interpolation which is effected on the basis of a known mathematical function for determining positions of the maximums and/or minimums between the measured values.

7. A method according to claim 5; wherein a unit between two extreme maximum or minimum values is determined as the central angle.

8. A method according to claim 1; wherein the angular unit closest to the determined distortion angle is defined as a central angle.

9. An apparatus for measuring the weft or mesh serial position in textiles, comprising:
illumination measuring means for measuring values of light from a light source passing through or reflected from the textiles to be tested, in a substantially linear range;

adjusting means for adjusting said linear range at an angle relative to the textiles, such that said linear range is tilted or rotated in several discrete equidistant angle units;

memory means for storing measured values corresponding to at least a few angular units; and a digital means connected to said memory means for comparing the stored values and calculating a distortion angle in response to the comparison.

10. An apparatus according to claim 9; wherein the angular width of said linear range is less than that of an angle unit.

11. An apparatus according to claim 9; further comprising means for detecting fabric speed or yarn count per unit time, said detecting means being connected with said adjusting means in a manner such that an adjusting speed defined by the number of angular units per time unit is proportional to the yarn count per unit time or to the speed of the fabric.

12. An apparatus according to claim 9; wherein said adjusting means is connected with said digital means in a manner such that said linear range is symmetrically adjusted with periodic oscillation about a central angle.

13. An apparatus according to claim 9; wherein said adjusting means comprises at least one stepping motor.

14. An apparatus according to claim 13; wherein said stepping motor is connected with drive means constructed in a manner such that said stepping motor is rotatable about its angle of rotation in equidistant, precise second angular units which are substantially smaller in volume than said first-mentioned angular units.

15. An apparatus according to claim 14; wherein said drive means comprises an additional stepping motor having laterally connected stepdown gears with an output shaft, and said stepping motor is coaxially mounted on said output shaft.

* * * * *